United States Patent
Uysal et al.

(10) Patent No.: US 10,541,967 B2
(45) Date of Patent: Jan. 21, 2020

(54) SYSTEM AND METHOD FOR ESTIMATING AND LIMITING USAGE OF NETWORK APPLICATIONS

(71) Applicant: ROQOS, INC., Tysons, VA (US)

(72) Inventors: Sezen Uysal, Great Falls, VA (US); Jong Lee, Ashburn, VA (US); Mukul Gandhi, Manassas, VA (US)

(73) Assignee: ROQOS, INC., Tysons, VA (US)

( * ) Notice: Subject to any disclaimer, the term of this patent is extended or adjusted under 35 U.S.C. 154(b) by 63 days.

(21) Appl. No.: 15/905,767

(22) Filed: Feb. 26, 2018

(65) Prior Publication Data

US 2018/0295096 A1    Oct. 11, 2018

Related U.S. Application Data

(60) Provisional application No. 62/464,931, filed on Feb. 28, 2017.

(51) Int. Cl.
*H04L 29/12* (2006.01)
*H04L 12/26* (2006.01)
*H04L 12/733* (2013.01)

(52) U.S. Cl.
CPC .......... *H04L 61/1511* (2013.01); *H04L 43/08* (2013.01); *H04L 45/20* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 7,792,994 B1 * | 9/2010 | Hernacki | H04L 12/66 709/229 |
| 2005/0204039 A1 * | 9/2005 | Douglis | H04L 29/12066 709/225 |
| 2016/0112523 A1 * | 4/2016 | Bagasra | G06F 16/95 709/217 |
| 2018/0026862 A1 * | 1/2018 | Shimoda | H04L 43/045 709/224 |

* cited by examiner

*Primary Examiner* — Scott B Christensen
(74) *Attorney, Agent, or Firm* — Baker & Hostetler LLP

(57) ABSTRACT

A system and method to estimate and to limit usage time of network applications by a centrally located router is provided. The router first modifies the Domain Name System (DNS) protocol's Time To Live (TTL) values to a fix value, then it counts the number of DNS queries for an application. Number of queries multiplied by the fixed TTL value gives estimated duration of the application.

19 Claims, 1 Drawing Sheet

SYSTEM AND METHOD FOR ESTIMATING AND LIMITING USAGE OF NETWORK APPLICATIONS

CROSS-REFERENCE TO RELATED APPLICATION

The present application claims priority to U.S. Provisional Patent Application No. 62/464,931, filed on Feb. 28, 2017, the disclosure of which is incorporated by reference in its entirety.

BACKGROUND

As we are more connected to Internet by many devices, estimating usage time of network applications connected to Internet has become more important for our lives, in terms of parental controls, employee monitoring, malware protection, etc. Most of these devices are mobile, have many types, and reside in many locations. Measuring usage time of Internet applications locally on each device is not only unpractical, but it is also expensive. This invention presents a practical and inexpensive way of estimating Internet usage time of network applications, as well as limiting their usage times.

On Internet, every service or website is referred by its domain name which is stored on Domain Name Servers (DNS server). As shown in FIG. 1, before a PC 100 wants to connect to a web server 130, first it send a query to its DNS server 140 to find the Internet Protocol (IP) address of the website. After the device gets the response from its DNS server, it connects to the website.

Every response from the DNS server has an expiration time called TTL embedded in the DNS response packet. The main reasons for using TTL are to adjust DNS load on authoritative DNS servers, to control propagation speed of DNS record changes, as well as to reduce effects of DNS cache poisoning.

SUMMARY OF THE INVENTION

This invention presents a system and a method to estimate and to limit usage time of network applications. Referring to FIG. 1, an embodiment of the invention centrally located in a network, such as a router 120, modifies TTL values in DNS responses for a website to a fixed time, and then counts DNS queries for that site to estimate the usage. To limit the usage of an application to a predefined duration, first this duration is converted to number of DNS queries, and then when the count of DNS query is achieved, the application is blocked by the router.

DETAILED DESCRIPTION

Figure 1:
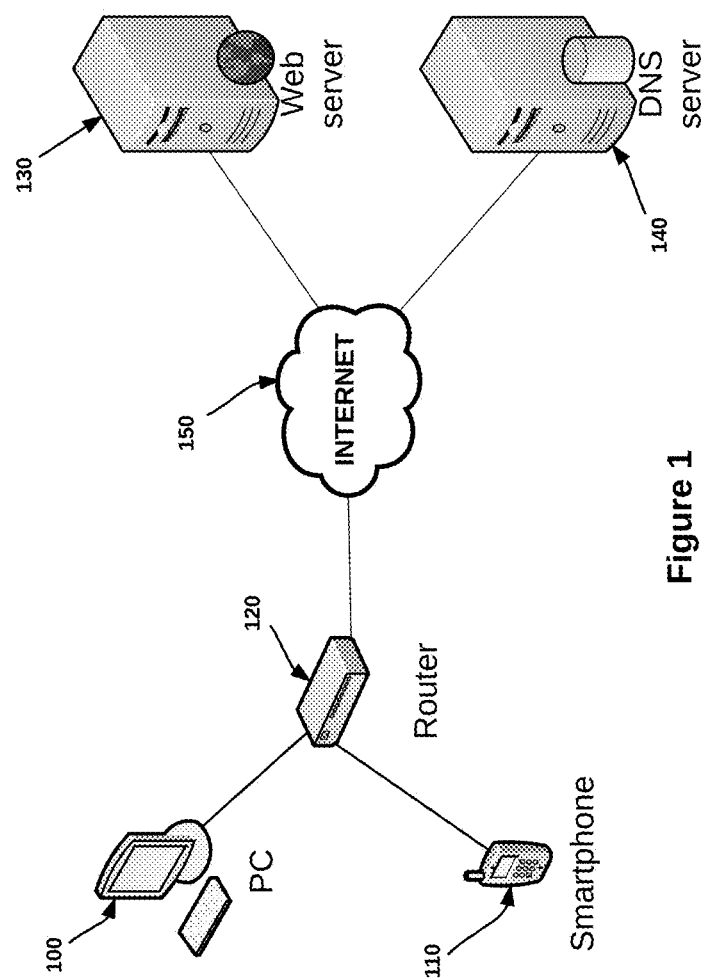
FIG. 1 depicts an embodiment of the invention where a router 120 is connected to the Internet 150 and runs a software to modify DNS responses from a DNS server 140 to resolve IP address of a web server 130, which is being accessed by a PC 100 and a smartphone 110.

This invention presents a system and a method to estimate usage time of network applications. Referring to FIG. 1, one embodiment of the invention uses an Internet connected home router 120. User devices such as a smartphone 110 starts a network application which needs to connect to a web server 130. First the smartphone sends a DNS query to resolve the IP address of the web server to its DNS server 140. Then the DNS server responds with the IP address along with TTL value of the response which is set by the owner of the DNS server.

The router modifies TTL value in the DNS response to a predefined fixed time such as 1 minute. Then the router forwards the modified DNS response to the smartphone.

Since the smartphone's DNS cache value expires at the end of the fixed time (according to the previous example, every 1 minute), the smartphone continuously sends a new DNS query at the expiration of each TTL value while the network application is running.

The router creates a table for each device connected to it. In that table, the router lists all network applications belonging to those devices. Next to each network application a counter shows DNS queries sent by each application. When a new DNS query is received from a network application, the router increments the counter for that network application.

The router is configured with a predefined inactivity timer which is set for each network application. The inactivity timer for an application is reset when there is new DNS query is received from that network application. When the inactivity timer expires for an application, that application is said finished its Internet communication, and the usage duration for that application is equal to multiplication of fixed TTL timer value and the number of DNS queries.

To put a time limit on a device's network application, first that time limit is converted to number of DNS queries, by dividing the duration of the time limit by the fixed TTL value. This would yield number DNS queries to be allowed from that network application. When this count of DNS queries is achieved, the network application is blocked by the router, hence the time limit is enforced.

What is claimed is:

1. A system to estimate a duration of a network application on at least one device connected to the Internet, wherein the system comprises:
   a router device configured to be connected to the Internet and further configured to be accessed by at least one device;
   the router device further configured to receive a Time To Live (TTL) value from one or more Domain Name System (DNS) responses in response to the at least one device starting a network application;
   the router device being further configured to modify the TTL value that was received from the one or more DNS responses for the network application to a fixed value; and
   the router device being further configured to count one or more additional DNS queries made by said network application implemented by the at least one device to estimate a duration of the network application on the Internet.

2. The system of claim 1,
   wherein the network application is a social media application running on the at least one device; and
   wherein the at least one device comprises a smartphone.

3. The system of claim 1,
   wherein the router device is further configured to execute software; and
   wherein the router device is further configured to execute the software to connect the at least one device to the Internet.

4. The system of claim 1,
wherein the router device is further configured to implement a predefined inactivity timer; and
wherein the predefined inactivity timer is configured to declare that the network application has ended communications with the Internet when there is no DNS query for said network application when the inactivity timer expires.

5. The system of claim 4, wherein said router device is configured to maintain a unique predefined inactivity timer for one or more network applications on the at least one device connected to said system.

6. The system of claim 4, wherein said inactivity timer is configured to decrement for the network application when there is no DNS query from the network application of the at least one device.

7. The system of claim 4, wherein said predefined inactivity timer is configured to reset to a predefined value for the network application, when said network application sends a new DNS query.

8. The system of claim 4, wherein when said inactivity timer expires for the network application, an estimated duration of said network application is defined to be a number of DNS queries from said network application, multiplied by a fixed TTL value.

9. The system of claim 1,
wherein the router device is further configured to limit a usage time of the network application on the at least one device to a desired duration,
wherein the router device is configured to convert said desired duration to a number of DNS queries by dividing the desired duration with a fixed TTL value,
wherein the router device is further configured to count DNS queries from said network application, and
wherein when the router device receives the number of DNS queries for said network application, then the router device is configured to block access between said network application and the Internet.

10. The system of claim 1, wherein the router device is further configured to transmit the TTL value that was modified to the at least one device.

11. The system of claim 1,
wherein the router device is further configured to generate a table for the at least one device connected to the router device; and
wherein the table comprises all network applications belonging to the at least one device and a number of DNS queries sent by each network application for the at least one device.

12. The system of claim 1, wherein the router device is further configured to receive the TTL value and the one or more Domain Name System (DNS) responses from at least one Domain Name Server in response to a query to the at least one Domain Name Server to resolve an Internet Protocol (IP) address of a website.

13. A method of estimating a duration of a network application on at least one device connected to the Internet, said method comprising:
implementing a router configured to connect to the Internet and further configured to be accessed by at least one device;
receiving with the router a Time To Live (TTL) value from one or more Domain Name System (DNS) responses in response to the at least one device starting a network application;
modifying with the router the TTL value from the one or more DNS responses for said network application to a fixed value; and
counting with the router one or more DNS queries made by said network application implemented by the at least one device to estimate a duration of the network application on the Internet.

14. The method of claim 13,
wherein the network application is a social media application running on the at least one device; and
wherein the at least one device comprises a smartphone.

15. The method of claim 13, further comprising executing software running on the router for connecting the at least one device to the Internet.

16. The A method of claim 13 further comprising:
limiting a usage time of the network application on the at least one device to a desired duration comprising:
converting said desired duration to a number of DNS queries by dividing the desired duration with a fixed TTL value,
counting DNS queries from said network application, and
blocking access between the network application and the Internet when the number of DNS queries are received for said network application.

17. The method of claim 13, wherein the router is further configured to transmit the TTL value that was modified to the at least one device.

18. The method of claim 13,
wherein the router is further configured to generate a table for the at least one device connected to the router; and
wherein the table comprises all network applications belonging to the at least one device and a number of DNS queries sent by each network application for the at least one device.

19. A system to estimate a duration of a network application on at least one device connected to the Internet, wherein the system comprises:
a network device configured to be connected to the Internet and further configured to be accessed by at least one device;
the network device further configured to receive a Time To Live (TTL) value from one or more Domain Name System (DNS) responses in response to the at least one device starting a network application;
the network device being further configured to modify the TTL value that was received from the one or more DNS responses for the network application to a fixed value; and
the network device being further configured to count one or more additional DNS queries made by said network application implemented by the at least one device to estimate a duration of the network application on the Internet,
wherein the network device is further configured to limit a usage time of the network application on the at least one device to a desired duration,
wherein the network device is configured to convert said desired duration to a number of DNS queries by dividing the desired duration with a fixed TTL value,
wherein the network device is further configured to count DNS queries from said network application, and
wherein when the network device receives the number of DNS queries for said network application, then the network device is configured to block access between said network application and the Internet.

* * * * *